Jan. 24, 1956 W. H. EVANS 2,731,858
CONNECTING ROD JIG FOR LINE REAMING AND BORING MACHINE
Filed Dec. 29, 1951 2 Sheets-Sheet 2
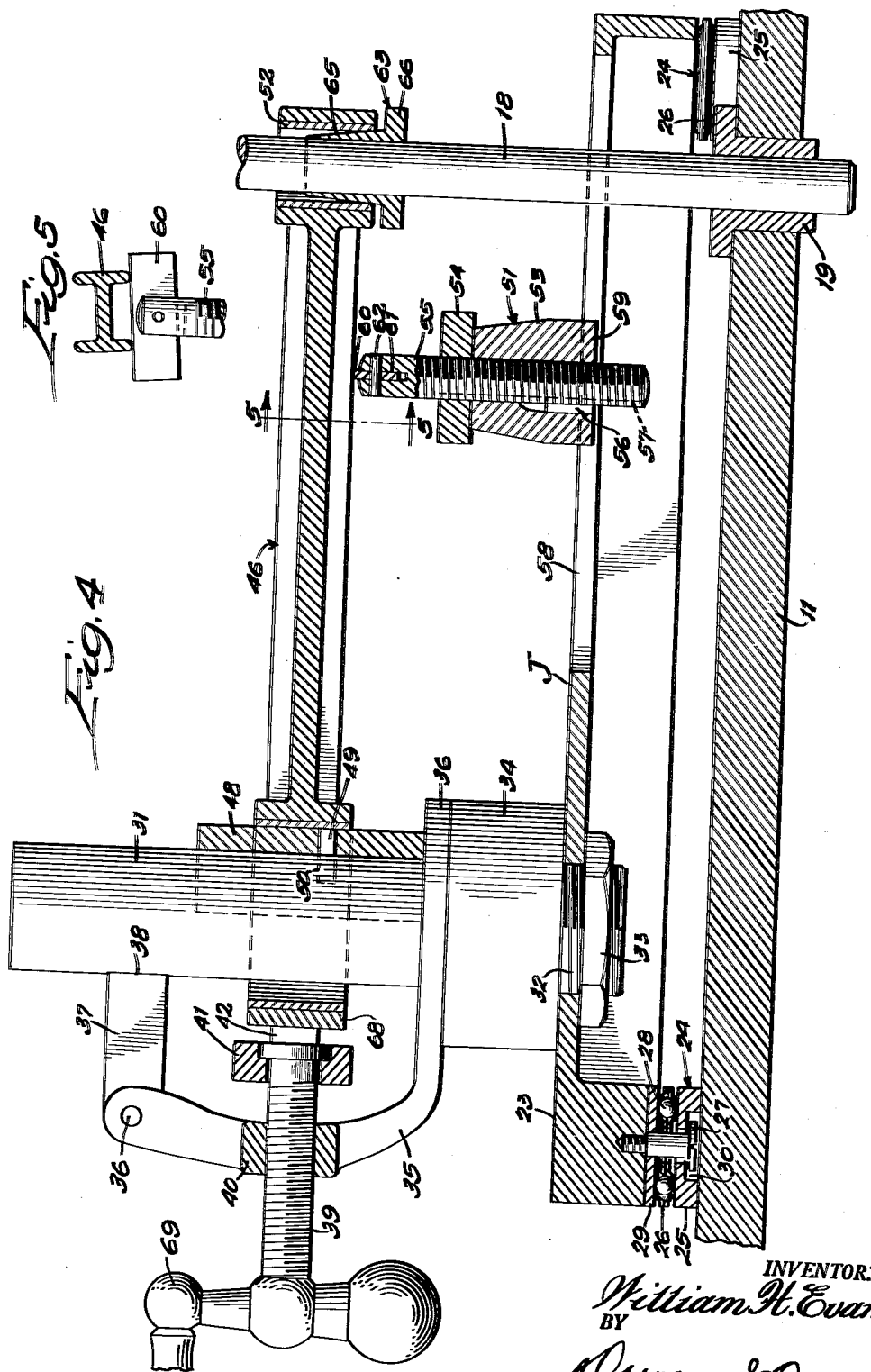
INVENTOR:
William H. Evans,
BY
Dawson & Ooms,
ATTORNEYS.

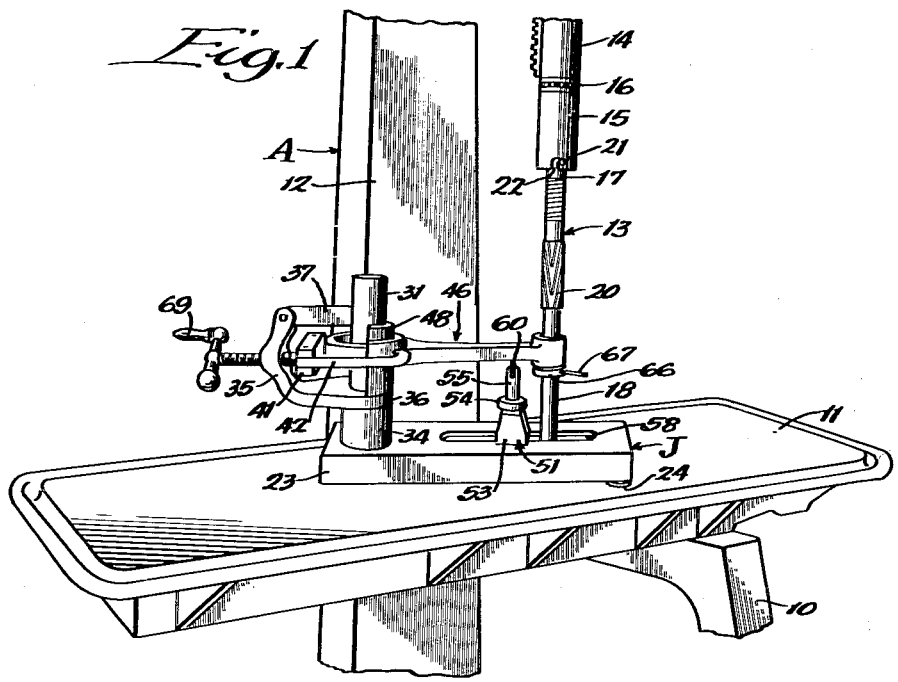

United States Patent Office 2,731,858
Patented Jan. 24, 1956

2,731,858

CONNECTING ROD JIG FOR LINE REAMING AND BORING MACHINE

William H. Evans, Miami Beach, Fla.

Application December 29, 1951, Serial No. 264,169

5 Claims. (Cl. 77—62)

This invention relates to a connecting rod jig for a line reaming and boring machine, and more particularly to a connecting rod jig for a line reaming and boring machine of the type characterized by a horizontal work-supporting bed and reamer rotatably suspended thereabove for vertical movement toward the bed during reaming operations.

The present case is a continuation-in-part of my co-pending application United States Serial No. 141,809, filed February 1, 1950, now Patent No. 2,584,005, for Line Reaming and Boring Machine.

In the overhauling of internal combustion engines, it is usually necessary to replace or repair the upper connecting rod bearings and in this connection it is common to replace wrist-pins which are 3 or 5/1000 oversize. In this operation it is necessary to ream the bearings in the piston in which the wrist-pin is supported as well as the upper connecting rod bearing which engages the central portion of the wrist-pin.

The bearings in the piston bosses require accurate reaming because they are frequently elongated as a result of the reciprocating vertical rod, and the connecting rod bearings are not only elongated but frequently are distorted due to twisting of the connecting rod itself. Such twisting is caused by the reduction of strain in the metal itself.

In rebuilding operations of the type discussed, the pistons are frequently reamed in such a way that the holes on the two sides of the skirt are not in alignment. When the upper connecting rod bearing is reamed by following the old opening and the wrist-pin is then fitted into the piston and upper connecting rod bearing, it is usually found that the main bearing at the bottom of the connecting rod is out of line with the wrist-pin bearing, and it is then necessary to twist and bend the connecting rod to obtain a proper alignment. As a result, the strain thus introduced into the connecting rod is relieved after some miles of operation and the piston is caused to bear more tightly against one side of the cylinder than the other, with the result that out-of-round cylinder bores and piston slap and other undesirable results follow.

Automobile factories spend large sums of money every year taking strains out of castings and metal before building automobile engines. Due to the need for high production, the time for such operations is limited and only about 80% of the strains are eliminated, the remaining 20% being released later in the operation of the engine when heating up and cooling off. During this latter operation, the connecting rod twists and tilts the pistons so that the rings are also tilted and wear barrel face to provide spaces through which oil may escape and also causing a reduction in compression.

In the practice described above of fitting oversized wrist-pins, it has been common to follow the old worn holes in the piston and connecting rod, then to put the rod in a straining fixture and twist it to bend the rod back into line. However, within a few days the new strains created by such bending in attempting to straighten the rod begin to release and the rings of the piston no longer lie flat against the wall of the cylinder. Thus the same trouble starts over again.

My new line reaming and boring machine and jig for holding pistons while their bearings are reamed therein are described and claimed in co-pending application 141,809, cited above. As previously indicated, however, in addition to reaming the wrist-pin bearings of the pistons, it is necessary to ream the upper bearings of the connecting rods to insure that the correct alignment between the piston, connecting rod, and crankshaft will be established and maintained in the assembled engine structure. Therefore, there is a need for providing a jig which is adapted to cooperate with a reaming apparatus having a horizontal work supporting bed with a reamer rotatably supported thereabove for vertical movement towards the bed during reaming operations.

It is therefore a general object of this invention to provide a jig for holding a connecting rod while reaming the upper bearing with a reaming apparatus of the character described which is adapted to insure that the upper bearing of the connecting rod will be reamed in accurate alignment with the lower bearing even though the upper and lower bearings are considerably out of alignment at the start of the reaming operation. Further objects and advantages will appear as the specification proceeds.

The invention is shown in an illustrative embodiment by the accompanying drawings, in which—

Figure 1 is a fragmentary perspective view of reaming apparatus of the type with which connecting rod jigs constructed in accordance with the principles of this invention find the greatest utility, showing my novel connecting rod jig supported on the horizontal work supporting bed of the reaming apparatus; Fig. 2, a plan view of the connecting rod jig of Fig. 1; Fig. 3, a perspective view of a centering bushing or tapered guide which I prefer to employ; Fig. 4, a longitudinal sectional view taken on the center line of Fig. 2; and Fig. 5, a fragmentary sectional view taken on line 5—5 of Fig. 4 showing the cooperative relationship between the downwardly extending flanges of the connecting rod and the pivotally supported bearing plate of the vertically adjustable support.

Looking first at Fig. 1, there is shown part of a reaming apparatus designated generally by A of the type with which the connecting rod jig of this invention finds its greatest utility. In the illustration given, reaming apparatus A includes a frame 10 upon which is supported a horizontal work supporting bed 11. Extending above the bed 11 is a standard 12 for rotatably supporting a reamer 13 above bed 11 for vertical movement toward bed 11 during reaming operations. Any suitable means can be employed for supporting reamer 13 in this manner. In the illustration given, there is shown a portion of a rack sleeve 14 which is adjustably connected to standard 12 by means not shown. Within rack sleeve 14 there is rotatably mounted a reamer spindle (not shown) which is driven by a motor (not shown) and in turn drives rotating head 15 which is spaced from rack sleeve 14 by thrust bearings 16.

In the illustration given, reamer 13 includes a solid mandrel 17 having its lower portion provided with a smooth extension 18 adapted to extend through a bearing 19 in bed 11, as shown more clearly in Fig. 4. Above the smooth extension are positioned the segmented reaming and boring elements 20. The reamer cutting and boring elements are of the type described in detail in my Patent No. 2,421,490, issued June 3, 1947, but other types of reamers can be employed. The upper end of reamer 13 is provided with laterally extending pins 21 which cooperate with inverted hook-shaped slots 22 to hold the upper end of reamer 13 within the socket provided by rotating head 15. This reaming apparatus is shown in greater detail in my co-pending application U. S. Serial No. 141,809, now Patent No. 2,584,005, previously cited, and also of my co-pending application U. S. Serial No. 246,841, filed September 15, 1951, now Patent No. 2,687,337.

Bed 11 provides a flat, smooth surface upon which the work piece to be reamed can be supported. The jig of this invention for supporting connecting rods for the reaming of their upper bearings by reamer 13 is designated generally as J. In the illustration given, jig J is provided with a base 23 resting on bed 11. Preferably, a plurality of thrust bearings are interposed between base 23 and bed 11 to permit base 23 to follow the lateral or amplitude movements of reamer 20 with a minimum of friction. This tends to prevent the reamer from cutting oversize when not running perfectly true, and thereby achieves more perfectly sized holes. The preferred means of supporting base 23 on thrust bearings is to incorporate them in a plurality of pedestals 24. In the illustration given and preferably, 3 support pedestals 24 are fastened to the bottom surface of base 23 in spaced-apart relation around the periphery thereof. While more than 3 pedestals can be employed, I prefer to limit the number of pedestals to 3 so that base 23 will be supported on bed 11 without tipping during reaming operations. As can readily be appreciated, it is almost impossible to have bed 11 exactly perpendicular to the axis of the reamer, and therefore there would be a tendency of the work holder to tip if it were supported on more than 3 pedestals during the reaming operation.

In the illustration given, pedestals 24 are formed from support disks 25, rings 26, and screws 27, as shown more clearly in Fig. 4. Within rings 26 there are rotatably supported a plurality of balls 28 which are adapted to bear against the upper surface of disk 25 and against the undersurface of bearing washers 29 which are attached to the underside of the marginal portions of base 23. Clearance is provided about the shank portion of screws 27 from rings 26 and support disk 25 to permit relative movement between the parts. For a similar reason, recesses 30 are made substantially larger than the heads of screws 27 to permit radial movement of the screw heads within the recesses.

At one end of base 23 there is mounted thereon a post 31 extending vertically upward therefrom. The lower end of post 31 is threaded and extends through opening 32 in base 23 with the protruding portions receiving lock nut 33. A collar 34 is received on post 31 and rests against the upper surface of base 23. Above collar 34 there is provided a fixed arm 35 having a lower cutout circular portion 36 received on post 31. Arm 35 extends rearwardly of collar 34 and then upwardly and its top is connected by pivot 36 to a movable abutment lug 37. The inner end 38 of abutment lug 37 is concave and adapted to firmly engage the surface of cylindrical post 31.

An actuating screw 39 extends through a threaded boss 40 integrally formed with arm 35. On the inner end of actuating screw 39 there is rotatably mounted a cross-link member 41. At its outer ends link member 41 is pivotally connected to draw arms 42 which have inwardly turned forward portions 43 adapted to engage the shoulders 44 or the heads of cap bolts 45 of connecting rod 46. Between post 31 and the upper portion 47 of the lower bearing of connecting rod 46 there is provided a semi-circular liner 48 of concavo-convex shape. The inner surface of liner 48 engages the surface of post 31 and its outer surface mates with the bearing surface of the upper portion 47 of the lower connecting rod bearing. The purpose of liner 48 is 2-fold. Primarily it permits the jig to be adapted for use with a wide variety of connecting rods having lower bearings of differing diameters. In other words, a number of liners 48 of different size can be provided for use with the jig, permitting one to be selected having an outer surface mating with the surface of the lower connecting rod bearing. Liner 47 also functions to reinforce the connecting rod in the area where the maximum stresses are created by the clamping of connecting rod 46 to post 31. If desired, liner 48 can be provided with a pin 49 engaging recess 50 of post 31, as shown more clearly in Figs. 2 and 3.

On the forwardly extending portion of base 23 there is slidably mounted a vertically adjustable support 51. The purpose of support 51 is to provide additional support adjacent the upper bearing 52 of connecting rod 46. In the illustration given, support 51 comprises a jig assembly having a base 53 supporting a rotatable threaded collar 54. A jackscrew 55 extends through collar 54 and base 53, screw 55 threadedly engages collar 54 and is keyed to base 53 by key member 56 engaging longitudinally extending key slot 57. Thus, screw 55 is permitted to move up and down within base 53 while being restrained from rotating with respect thereto. Therefore, the rotation of collar 54 affects the raising and lowering of screw 55. To maintain support 51 on a fixed longitudinal line with respect to post 31, base 23 is provided with a longitudinally extending slot 58 which slidably receives the downwardly extending lug portion 59 of base 53, as shown more clearly in Fig. 4. As shown in Fig. 2 base 53 is wider than slot 58 so that it rides on the upper surface of base 23 over slot 58.

A narrow bearing plate 60 is pivotally mounted in slot 61 in the upper end of screw 55 on pivot pin 62. In the illustration given and preferably bearing plate 60 is pivotally mounted on an axis aligned with the longitudinal axis of connecting rod 46. This permits the upper surface of bearing plate 60 to solidly engage the underside of the connecting rod. In the manufacturing of connecting rods no particular effort is made to have the flanges of the I-shaped portions terminate at the same distance from the central axis of the connecting rod. As indicated more clearly in Fig. 5, the pivotal mounting of bearing plate 60 allows it to conform to the irregularities of the downwardly extending portions of the connecting rod flanges. Thus, the slightly different heights of the ends of the connecting rod flanges above base 23 will not interfere with the solid supporting of the connecting rod on support 51.

To align reamer 13 with upper connecting rod bearing 52 for the reaming operation, I prefer to employ a hollow bushing or tapered collar 63, as illustrated more clearly in Fig. 3. The bushing is of a diameter permitting it to make a firm sliding contact with the lower end portion of the reamer shaft. The side walls of the tapered portion are preferably cut away to form oppositely disposed flattened portions 64 to permit oil to flow past the bushing during the initial stages of the reaming operation. The arcuate portions 65 remaining between flattened portions 64 contact the inner surface of the connecting rod bearing 52, as shown in Fig. 4. The bushing also includes a disk portion 66 to which is connected a guide pin 67.

Operation

In using a connecting rod jig of the type described herein, it is unnecessary for the operator to disconnect the lower bearing cap 68 from the upper integral portion 47 of the lower connecting rod bearing to which it is normally attached by cap bolts 45. The pivotal mounting of abutment lug 37 permits it to be raised by the operator so that the lower bearing of the connecting rod can be placed on post 31 and lowered to the position shown in Figs. 1 and 4 of the drawings. Previously a liner 48 of the appropriate size has been positioned on post 31. The inwardly turned portions 43 of draw arms 42 are then seated on cap bolts 45 or bolts 44 of the connecting rod if the lower bearing cap 68 has been removed. Abutment lug 37 is lowered into engagement with posts 31 and screw 39 is rotated by handle 69 in a direction to pull connecting rod 46 toward post 31 with liner 48 therebetween. After the connecting rod has been loosely clamped in position support 51 is moved to a position adjacent the upper connecting rod bearing 52. The connecting rod is then centered above bearing plate 60, and screw 58 is elevated by rotating collar 54 until the bottom of the connecting rod is loosely engaged. Handle 69 is then rotated in a direction to complete the clamping of the connecting rod to post 31. Screw 55 is finally adjusted to cause bearing plate 60 to solidly engage both of the downwardly extending flanges of the connecting rod and to hold it with its central longitudinal axis lying in a horizontal plane. As indicated above, bearing plate 60 can pivot on pin 62 to adjust to the slight variations in elevation of the lower edges of the connecting rod flanges.

The jig J is then shifted on bed 11 until the upper bearing is beneath reamer 13. The smooth extension 18 of the reamer is lowered through bearing 52 until it engages bearing 19 in bed 11, as shown more clearly in Fig. 4. Bushing 63 which had been placed on extension 18 after it was passed through bearing 52 is then raised to the position shown in Figs. 1 and 4 to complete the centering of bearing 62 with respect to reamer 13.

The reamer is then started and if desired a flow of oil can be directed on bearing 52. While continuing to urge bushing 63 upwardly with the tips of the fingers of one hand to center the upper bearing with respect to the reamer, the reamer is lowered into engagement with the upper portion of bearing 52. Since the upper bearing will generally be considerably out of alignment with the lower bearing the cutting elements of the reamer will initially touch mainly on one side of the bearing which will tend to twist the connecting rod. The free support of the forward portion of the connecting rod on pivotally mounted bearing plate 60 in cooperation with the fixed anchoring of the lower bearing to post 31 will cause the torsional forces created by the engagement of the reamer with the bearing to be distributed along the full length of the connecting rod. This permits bearing 52 to pivot slightly as it is initially engaged by the reamer without introducing permanent strains in the connecting rod, which would later be released in the heating and cooling of the engine and cause the connecting rod to twist the piston out of proper alignment with the cylinder. In other words, the full length of the connecting rod is employed to provide a spring mounting for the upper bearing while it is being reamed. The torsional forces set up in the connecting rod by the initial engagement of the reamer with the upper portion of the bearing are accepted by the full length of the connecting rod and permit bearing 52 to rotate slightly without stressing any portion of the connecting rod beyond its elastic limit. The torsional forces set up in the connecting rod cause the upper bearing to be forced against the reamer until a hole is cut permitting the complete release of the torsional stress. This insures that the upper connecting rod bearing will be reamed in perfect alignment with the lower connecting rod bearing even though these bearings are considerably out of alignment at the start of the reaming operation.

While in the foregoing specification, I have set forth a specific structure in considerable detail for the purpose of illustrating an embodiment of my invention, it will be understood that many of the structural details can be varied widely by those skilled in the art without departing from the spirit of my invention.

I claim:

1. In a reaming apparatus providing a horizontal work supporting bed and a reamer rotatably suspended thereabove for vertical movement toward said bed during reaming operations, a jig for holding a connecting rod while reaming the upper bearing, comprising a base resting on said bed, a post mounted on said base and extending vertically upward therefrom, a liner engaging said post and having an outer surface mating with the upper integral portion of the lower bearing of said connecting rod, clamping means for grasping the shoulders of said connecting rod and pulling said rod toward said post with said liner therebetween, and a vertically adjustable support carried by said base beneath said connecting rod at a spaced distance from said post, said support providing a bearing plate pivotally mounted on an axis aligned with the longitudinal axis of said connecting rod and solidly engaging the underside of said connecting rod while at the same time permitting the supported portion of said rod to adjust its position during the reaming of the upper bearing of said rod, whereby said upper bearing can be reamed in accurate alignment with said lower bearing even though said bearings are considerably out of alignment at the start of the reaming operation.

2. In a reaming apparatus providing a horizontal work supporting bed and a reamer rotatably suspended thereabove for vertical movement toward said bed during reaming operations, a jig for holding a connecting rod while reaming the upper bearing, comprising a base resting on said bed, a post mounted on said base and extending vertically upward therefrom, a concavo-convex liner received on said post and engaging the upper portion of the lower bearing of said connecting rod, clamping means for grasping the shoulders of said connecting rod and pulling said rod toward said post with said liner therebetween, and a vertically adjustable support carried by said base beneath said connecting rod adjacent the upper bearing thereof, said support providing a bearing plate pivotally mounted on a horizontal axis aligned with the central longitudinal axis of said connecting rod, said bearing plate freely engaging both of the downwardly extending flange portions of said connecting rod while at the same time permitting the supported portion of said rod to adjust its position during the reaming of the upper bearing of said rod, whereby said upper bearing can be reamed in accurate alignment with said lower bearing even though said bearings are considerably out of alignment at the start of the reaming operation.

3. In a reaming apparatus providing a horizontal work supporting bed and a reamer rotatably suspended thereabove for vertical movement toward said bed during reaming operations, a jig for holding a connecting rod while reaming the upper bearing, comprising a base equipped with three downwardly extending pedestals freely resting on said bed so that said base can be shifted on said bed to various positions thereon, a post mounted on said base and extending vertically upward therefrom, a liner engaging said post and having an outer surface mating with the upper integral portion of the lower bearing of said connecting rod, clamping means for grasping the shoulders of said connecting rod and pulling said rod toward said post with said liner therebetween, and a vertically adjustable support slidably carried by said base for positioning beneath said connecting rod at varying distances from said post, said support providing a bearing plate pivotally mounted on an axis aligned with the longitudinal axis of said connecting rod and solidly engaging the underside of said connecting rod while at the same time permitting the supported portion of said rod to adjust its position during the reaming of the upper bearing of said rod, whereby said upper bearing can be reamed in accurate alignment with said lower bearing even though said bearings are considerably out of alignment at the start of the reaming operation.

4. In a reaming apparatus providing a horizontal work supporting bed and a reamer rotatably suspended thereabove for vertical movement toward said bed during reaming operations, a jig for holding a connecting rod while reaming the upper bearing, comprising a base shiftably supported on said bed by a plurality of thrust bearings a post mounted on said base and extending vertically upward therefrom, a concavo-convex liner received on said post and engaging the upper portion of the lower bearing of said connecting rod, clamping means for grasping the shoulders of said connecting rod and pulling said rod toward said post with said liner therebetween, and a vertically adjustable support carried by said base beneath said connecting rod adjacent the upper bearing thereof, said support providing a bearing plate pivotally mounted on a horizontal axis aligned with the central longitudinal axis of said connecting rod, said bearing plate freely engaging both of the downwardly extending flange portions of said connecting rod while at the same time permitting the supported portion of said rod to adjust its position during the reaming of the upper bearing of said rod, whereby said upper bearing can be reamed in accurate alignment with said lower bearing even though said bearings are considerably out of alignment at the start of the reaming operation.

5. In a reaming apparatus providing a horizontal work supporting bed and a reamer rotatably suspended thereabove for vertical movement toward said bed during reaming operations, a jig for holding a connecting rod while reaming the upper bearing, comprising a base equipped with three spaced apart downwardly extending pedestals freely resting on said bed so that said base can be shifted with respect to said bed, each of said pedestals including a plurality of thrust bearings for supporting said base and facilitating amplitude movements of said base with respect to said bed, a post mounted on said base and extending vertically upward therefrom, a concavo-convex liner received on said post and engaging the upper portion of the lower bearing of said connecting rod, clamping means for grasping the shoulders of said connecting rod and pulling said rod toward said post with said liner therebetween, and a vertically adjustable support carried by said base beneath said connecting rod adjacent the upper bearing thereof, said support providing a bearing plate pivotally mounted on a horizontal axis aligned with the central longitudinal axis of said connecting rod, said bearing plate freely engaging both of the downwardly extending flange portions of said connecting rod while at the same time permitting the supported portion of said rod to adjust its position during the reaming of the upper bearing of said rod, whereby said upper bearing can be reamed in accurate alignment with said lower bearing even though said bearings are considerably out of alignment at the start of the reaming operation.

References Cited in the file of this patent

UNITED STATES PATENTS

| | | |
|---|---|---|
| 1,520,623 | Weiskoff | Dec. 23, 1924 |
| 2,218,380 | Evans | Oct. 15, 1940 |